United States Patent
Göhring (12)

(10) Patent No.: US 6,445,083 B2
(45) Date of Patent: *Sep. 3, 2002

(54) METHOD AND DEVICE FOR CONTROLLING A POWER ADJUSTMENT MEANS OF A VEHICLE ENGINE

(75) Inventor: Frank Göhring, Frankfurt (DE)

(73) Assignee: Mannesmann VDO AG, Frankfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/371,868

(22) Filed: Aug. 5, 1999

(30) Foreign Application Priority Data

Aug. 10, 1998 (DE) .......................... 198 36 059

(51) Int. Cl.[7] .............................................. B60R 25/00
(52) U.S. Cl. ..................... 307/10.2; 307/10.6
(58) Field of Search ............... 307/10.1, 10.2, 307/10.6, 29; 340/825.69, 825.31; 701/110, 114

(56) References Cited

U.S. PATENT DOCUMENTS

| 4,319,658 | A | | 3/1982 | Collonia et al. | |
|---|---|---|---|---|---|
| 5,703,423 | A | | 12/1997 | Fukao et al. | |
| 5,736,935 | A | * | 4/1998 | Lambroupoulos | 340/825.69 |
| 5,745,026 | A | | 4/1998 | Kokubu et al. | |
| 5,828,297 | A | * | 10/1998 | Banks et al. | 340/426 |
| 5,835,868 | A | | 11/1998 | McElroy et al. | |
| 6,125,322 | A | * | 9/2000 | Bischof et al. | 701/114 |

FOREIGN PATENT DOCUMENTS

| DE | 2731089 | 1/1979 |
|---|---|---|
| DE | 4434587 | 4/1995 |
| DE | 19630747 | 9/1997 |
| DE | 19642017 | 4/1998 |
| DE | 69407089 | 4/1998 |
| DE | 19746608 | 2/1999 |
| EP | 0050707 | 5/1982 |
| EP | 0801192 | 10/1997 |
| FR | 2733191 | 10/1996 |
| GB | 2309488 | 7/1997 |
| WO | 9218732 | 10/1992 |

* cited by examiner

*Primary Examiner*—Kim Huynh
*Assistant Examiner*—Sharon Polk
(74) *Attorney, Agent, or Firm*—Martin A. Farber

(57) ABSTRACT

In electronic systems for power adjustment in motor vehicles, conventional mechanical linkages or Bowden cables are replaced or supplemented by the transmission of electric signals. Such an electronic power adjustment device contains a control unit (6) which acts on the power adjustor (9) via an electric actuator (8). In order to influence the engine power, an accelerator pedal (5) is provided as a setpoint generator. In a converter (7), the accelerator pedal position is converted into an electric signal which is supplied to the control unit (6). During the starting of the vehicle, a driving authorization control is carried out. The vehicle engine can already be started during the driving authorization control, but accelerator pedal position is taken into account by the control unit (6) only when the driving authorization control is concluded positively. This ensures both a reliable control of driving authorization and comfortable and reliable starting of the vehicle engine by an authorized driver.

14 Claims, 2 Drawing Sheets

METHOD AND DEVICE FOR CONTROLLING A POWER ADJUSTMENT MEANS OF A VEHICLE ENGINE

FIELD AND BACKGROUND OF THE INVENTION

The invention relates to a method for controlling a power adjustment means of a vehicle engine, in which the vehicle engine is started by the actuation of an ignition starter lock system, the position of an accelerator pedal is converted into an electric signal and the signal proportional to the position of the accelerator pedal is supplied to a control unit which, from the electric signal of the accelerator pedal position and from further measurement signals, generates an output signal for controlling the power adjustment means, and to a device for carrying out the method.

For some time, mechanical systems for power adjustment in vehicles have increasingly been replaced or supplemented by electronic systems. In this case, the transmission of electric signals is substituted for conventional mechanical linkages or Bowden cables. Such an electronic gas system is known, for example, from EP 0,050,707 A1. The power adjustment means of the vehicle engine is designed, there, in the form of a throttle valve, the actuating drive of the throttle valve being controlled by regulating electronics. The regulating electronics receive, as input variables, the electric signal of an accelerator pedal (setpoint generator) for controlling the vehicle speed and further measurement signals which are important for the idling speed. The entire system thus operates by means of purely electric connections between the individual components, with the result that the susceptibility to faults is reduced and restrictions regarding the travel distance between the accelerator pedal, control electronics and power adjustment means are eliminated.

The increasing use of electronic components in motor vehicles has led not only to the replacement of mechanical components, as in the case of the power adjustment means described, but also to the use of entirely new functional devices. The latter include electronics systems for access or driving authorization control, with the aid of which the vehicle is to be prevented from being stolen. WO 92/18732 describes a device which carries out access authorization control. This device contains a first part, which is arranged in the vehicle, and a second part, which is carried by a person. Signal transmission takes place bidirectionally between the two parts. The part to be carried by the person transmits a coded signal which is received and decoded by the part located in the vehicle. When the part located in the vehicle recognizes the signal, a vehicle door is unlocked and the alarm system is cut off, so that it is possible for the vehicle to be used. In these systems, there is the problem that the transmitted signal may be tapped and subsequently misused by unauthorized third parties by means of suitable devices.

Another embodiment of a system for driving authorization control is known from DE 44 34 587 A1. This describes an electronic ignition starter lock system with an electronic ignition starter lock and with an electronic ignition key, the ignition key exchanging coded signals with the ignition lock. Only when the result of the evaluation of the coded signal transmitted is positive will an electromagnetic immobilizer be unlocked and does it become possible for the key to be turned in order to start the vehicle.

This blocking of the key during the transmission and evaluation of the exchanged signals may be irritating to the driver.

SUMMARY OF THE INVENTION

The object of the invention is to combine an initially described electronic method for controlling a power adjustment means of a vehicle engine with driving authorization control, specifically in such a way that, on the one hand, a high degree of security is achieved, but, on the other hand, the driver is not irritated by the driving authorization control, and, for the authorized driver, the starting operation takes place virtually unchanged, as compared with vehicles without driving authorization control.

In a method of the introductory-mentioned type for controlling a power adjustment means of a vehicle engine, the object is achieved in that driving authorization control is started when the ignition starter lock system is actuated, during the driving authorization control, the output signal from the control unit is formed solely from the further measurement signals, without the signal of the accelerator pedal position being taken into account, and after the positive conclusion of the driving authorization control, the signal of the accelerator pedal position is taken into account by the control unit in the formation of the output signal, or after the negative conclusion of the driving authorization control, the starting operation is discontinued by the control unit.

In order to carry out the method according to the invention, a device is provided which contains an accelerator pedal, a converter for converting the accelerator pedal position into an electric signal and a control unit for converting the electric signal of the accelerator pedal position and further measurement signals into an output signal for controlling a power adjustment means of the vehicle engine, there being, furthermore, means for carrying out driving authorization control, which are connected to the control unit in such a way that, during the driving authorization control, the output signal from the control unit is formed solely from the further measurement signals, without the signal of the accelerator pedal position being taken into account.

According to particular embodiments of the device according to the invention, there is provision for the means for driving authorization control to be integrated at least partially into an electronic ignition starter lock system, whilst, particularly in the ignition starter lock system, a wireless exchange of coded data takes place between the ignition lock and an ignition key. There is provision, furthermore, for inductive energy transmission to take place between the ignition lock and the ignition key in order to supply energy to the electronic components integrated in the ignition key.

By means of the specified method and the specified device, driving authorization control systems known per se, which are often also referred to as electronic immobilizers, are combined, according to the invention, with electronic controls, likewise known per se, for power adjustment, so-called "electronic acceleration", in such a way as to achieve both a high degree of security in the driving authorization control and comfortable and reliable starting of the vehicle engine by an authorized driver.

BRIEF DESCRIPTION OF THE DRAWINGS

The invention is described by an embodiment example in more detail below with reference to the Figures of the drawing of which.

DETAILED DESCRIPTION OF THE PREFERRED EMBODIMENT

Figure 1:
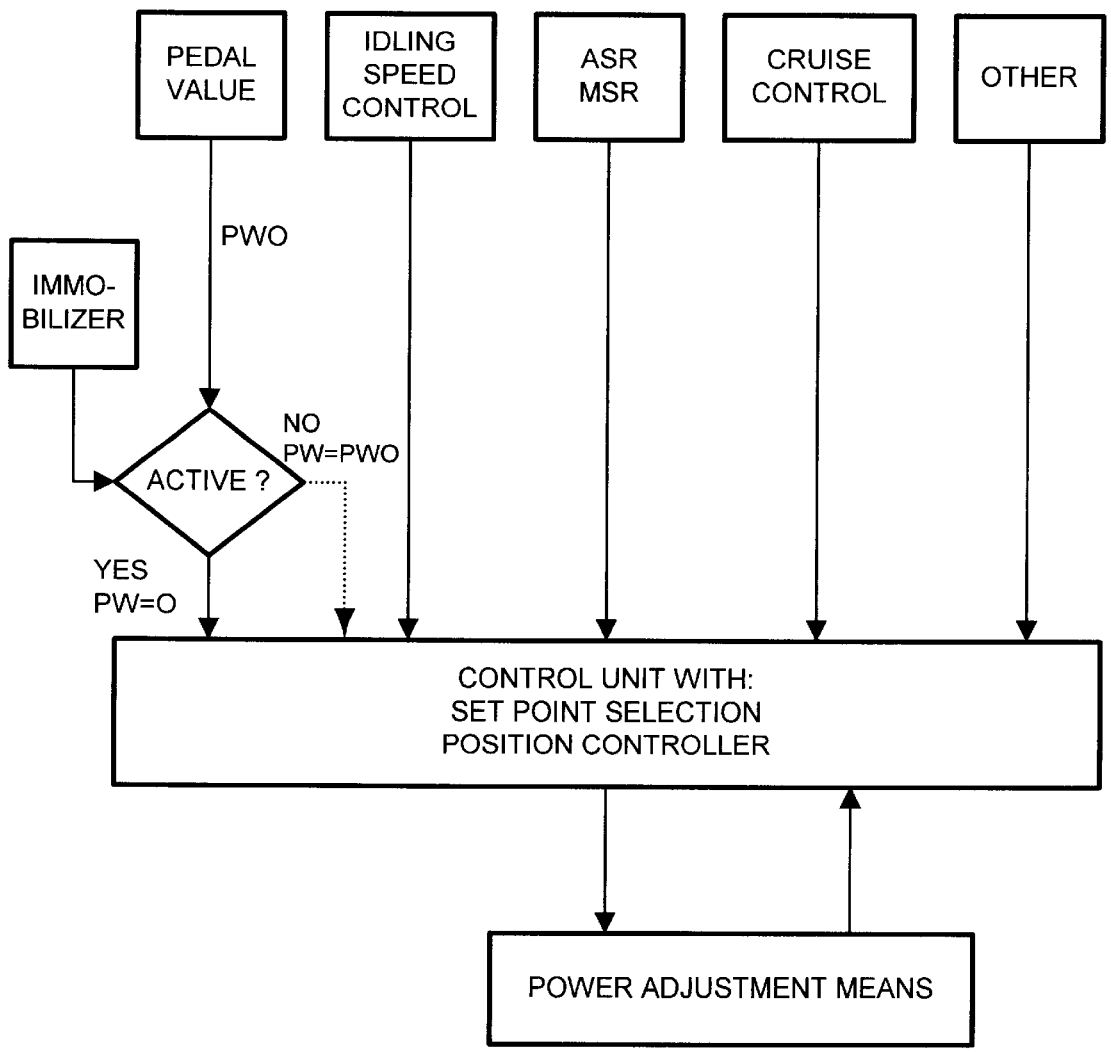
FIG. 1 shows a flow chart of the method according to the invention.

According to the flow chart illustrated in FIG. 1, a plurality of input signals are supplied to the control unit for the power adjustment means which may be a throttle valve or injection valves. These signals are not only electric signals from the accelerator pedal, but, in particular, the signal from the idling-speed regulator, by means of which the idling of the vehicle engine is regulated, signals from a traction control system (ASR) and from an automatic speed regulator and other values which, if appropriate, are relevant to power adjustment.

The control unit contains both setpoint selection from the multiplicity of the input values mentioned as well as a position controller which is in direct interaction with the actuating element of the power adjustment means. So far, what has been referred to is a known fully electronic control of a power adjustment means of a motor vehicle. There is now provision, according to the invention, for an interrogation of driving authorization to take place in addition, said interrogation being started when the ignition is switched on. If the immobilizer is still active, that is to say if the driving authorization control is not yet concluded, the pedal value is not taken into account in the setpoint selection. In this case, the pedal value is set to zero, irrespective of the position of the accelerator pedal.

It is already possible to start the engine in the checking phase of driving authorization, but the engine speed cannot be increased beyond idling speed and the vehicle is therefore still immobilized. Only when the driving authorization control is concluded positively is the immobilizer deactivated and the pedal value taken into account in the setpoint selection and does it become possible for the vehicle to be driven. By contrast, if the driving authorization control is concluded negatively, the engine is switched off again via the engine electronics and the starting operation is thus discontinued.

Figure 2:
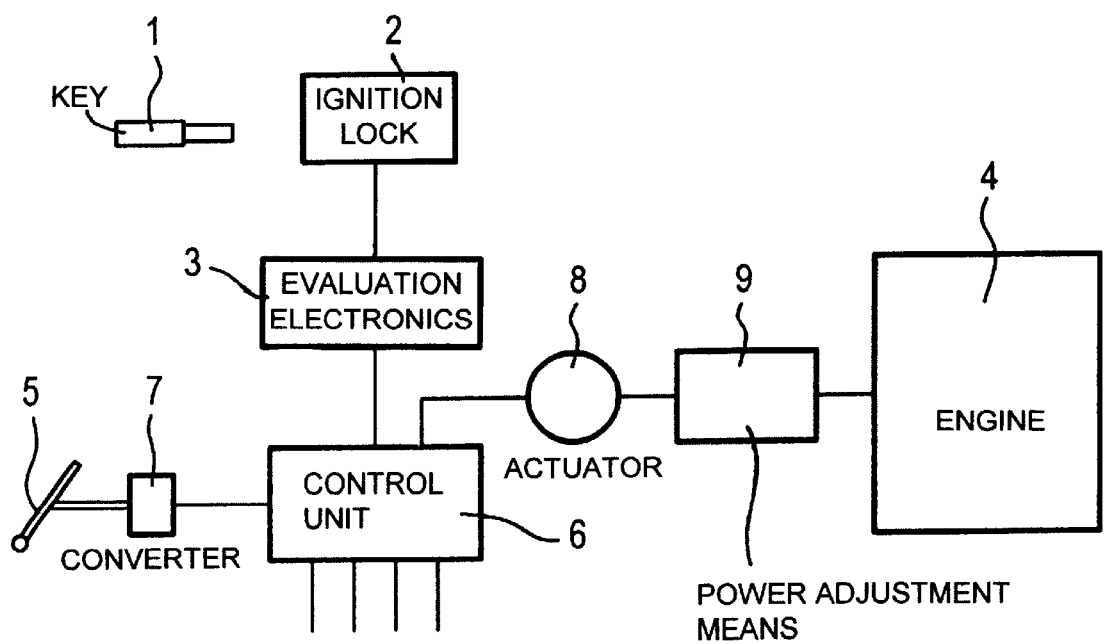
FIG. 2 shows a block diagram of a device for carrying out the method.

FIG. 2 shows a block diagram of a device for carrying out the method according to the invention.

When a person intends to drive the vehicle, the key 1 is inserted into the ignition lock 2 in the usual way and the ignition is switched on. When the ignition is switched on, the driving authorization control is started. For this purpose, the ignition key exchanges coded signals with the ignition lock. In order to do this, the ignition key contains suitable electronics which contain an encoder and a transmitter connected to the encoder. The ignition lock contains a receiver for receiving the signals transmitted by the ignition key and a decoder for decoding the signals received. Evaluation electronics 3 evaluate the received and decoded signals and, if the result of the check is positive, send a corresponding signal to the control unit 6.

If the signals from the ignition key are recognized by the evaluation electronics 3, this means that the key belongs to the ignition lock, and the immobilizer is deactivated.

In order to influence the engine power, an accelerator pedal 5 is provided as a setpoint generator which is actuated by the driver. In a converter 7, an electric signal proportional to the accelerator pedal position is generated and is conducted to the control unit 6. The control unit 6 receives further input signals from actuators which are not shown here. Finally, the output signal from the control unit 6 is output to an electric actuator 8 which acts on a power adjustment means 9.

Carrying out the driving authorization control takes up only a short period of time. When the driving authorization control commences, however, the driver can already start the engine 4 in the usual way, the latter operating in the idling mode, so that there is neither any loss of comfort nor can additional cold-starting problems arise, since the starter is already turning. During the driving authorization control, however, it is not possible for the driver to increase the engine speed by actuating the accelerator pedal 5. The engine will run only at idling speed for the duration of the driving authorization control. Only after the driving authorization control has been concluded positively can the engine speed be increased by the actuation of the accelerator pedal 5, as a result of which the vehicle assumes the normal driving operating state.

It is possible to determine whether the pedal value is available for setpoint selection in the control unit both by means of hardware and by means of software.

In the form of construction using hardware, there is provided an electronic switching element which is integrated into the control unit and which, in the case of a positive conclusion of the driving authorization control, is switched through by a signal from the evaluation electronics 3 of the immobilizer and thus supplies the pedal value for setpoint selection. Determining whether the pedal value is taken into account in the setpoint selection or not may also be carried out purely via suitable programming of the control unit 6. Moreover, the evaluation unit 3 may be integrated in the control unit 6.

If, during the driving authorization control, the signal transmitted from the ignition lock to the ignition key is not recognized by the evaluation electronics 3, the engine is switched off via the control unit 6, in order to prevent unauthorized use of the vehicle. Since up to this moment the engine has run at idling speed and only for a short time, the vehicle cannot be moved thereby, with the result that the functioning of the immobilizer is ensured.

What is claimed is:

1. A method for controlling a power adjustment means of a vehicle engine, in which the vehicle engine is started by the actuation of an ignition starter lock system, the position of an accelerator pedal is converted into an electric signal and the signal proportional to the position of the accelerator pedal is supplied to a control unit which, from the electric signal of the accelerator pedal position and from further measurement signals, generates an output signal for controlling the power adjustment means, wherein driving authorization control is started when the ignition starter lock system is actuated, during the driving authorization control, the output signal from the control unit is formed solely from the further measurement signals, without the signal of the accelerator pedal position being taken into account, and after the positive conclusion of the driving authorization control, the signal of the accelerator pedal position is taken into account by the control unit in the formation of the output signal, or after the negative conclusion of the driving authorization control, the starting operation is discontinued by the control unit.

2. A device for controlling the power of a vehicle engine (4), said device containing an accelerator pedal (5), a converter (7) for converting the accelerator pedal position into an electric signal and a control unit (6) for converting the electric signal of the accelerator pedal position and further measurement signals into an output signal for controlling a power adjustment device (9) of the vehicle engine (4), wherein there are, furthermore, means (1, 2, 3) for carrying out driving authorization control, which are connected to the control unit (6) in such a way that, during the driving authorization control, the output signal from the control unit (6) is formed solely from the further measurement signals, without the signal of the accelerator pedal position being taken into account wherein the vehicle engine is able to be started prior to carrying out driving authorization control.

3. The device as claimed in claim 2,
wherein the means for driving authorization control are integrated at least partially into an ignition starter lock system.

4. The device as claimed in claim 3, wherein, in the ignition starter lock system, a wireless exchange of coded data takes place between an ignition lock (2) and an ignition key (1).

5. The device as claimed in claim 4, wherein,
said means for driving authorization control comprises evaluation electronics which evaluate received and decoded signals and, if there is a positive evaluation result, send a corresponding signal to the control unit.

6. The device as claimed in claim 3, wherein inductive energy transmission takes place between the ignition lock (2) and the ignition key (1).

7. The device as claimed in claim 2, wherein,
said means for driving authorization control comprises evaluation electronics.

8. The device as claimed in claim 2, wherein when the vehicle engine is started, an engine speed cannot be increased beyond idling speed prior to a positive conclusion of the driving authorization control.

9. The device as claimed in claim 8, further comprising an idling speed regulator for regulating the idling speed of the vehicle.

10. The device as claimed in claim 2, further comprising at least one of a traction control unit and an automatic speed regulator for providing control signals to said control unit for adjusting power.

11. A device for controlling the power of a vehicle engine (4), said device containing an accelerator pedal (5), a converter (7) for converting the accelerator pedal position into an electric signal and a control unit (6) for converting the electric signal of the accelerator pedal position and further measurement signals into an output signal for controlling a power adjustment device (9) of the vehicle engine (4), wherein the vehicle engine is started by the actuation of an ignition started lock system prior to carrying out driving authorization control there are, furthermore, means (1, 2, 3) for carrying out driving authorization control, which are connected to the control unit (6) in such a way that, during the driving authorization control, the output signal from the control unit (6) is formed solely from the further measurement signals, without the signal of the accelerator pedal position being taken into account.

12. The device as claimed in claim 11, wherein the vehicle engine is switched off upon a negative conclusion of the driving authorization control.

13. The device as claimed in claim 11, wherein when the vehicle engine is started, an engine speed cannot be increased beyond idling speed prior to a positive conclusion of the driving authorization control.

14. The device as claimed in claim 13, further comprising an idling speed regulator for regulating the idling speed of the vehicle.

* * * * *